(12) United States Patent
Schmidt et al.

(10) Patent No.: US 12,047,523 B2
(45) Date of Patent: Jul. 23, 2024

(54) MOBILE DEVICE, CAMERA MODULE, AND MOBILE DEVICE SYSTEM

(71) Applicant: Leica Camera AG, Wetzlar (DE)

(72) Inventors: Malte Schmidt, Linden (DE); Boris Pantel, Graefelfing (DE); Florian Weiler, Lahnau (DE)

(73) Assignee: Leica Camera AG, Wetzlar (DE)

( * ) Notice: Subject to any disclaimer, the term of this patent is extended or adjusted under 35 U.S.C. 154(b) by 71 days.

(21) Appl. No.: 17/916,489

(22) PCT Filed: Mar. 17, 2021

(86) PCT No.: PCT/EP2021/056791
§ 371 (c)(1),
(2) Date: Sep. 30, 2022

(87) PCT Pub. No.: WO2021/197849
PCT Pub. Date: Oct. 7, 2021

(65) Prior Publication Data
US 2023/0224390 A1   Jul. 13, 2023

(30) Foreign Application Priority Data
Mar. 31, 2020   (DE) ............... 10 2020 108 961.9

(51) Int. Cl.
*H04M 1/02* (2006.01)
*H04N 23/51* (2023.01)
*H04N 23/57* (2023.01)

(52) U.S. Cl.
CPC .......... *H04M 1/0264* (2013.01); *H04N 23/51* (2023.01); *H04N 23/57* (2023.01)

(58) Field of Classification Search
CPC .. H04M 1/0264; H04M 1/0254; H04N 23/51; H04N 23/57

(Continued)

(56) References Cited

U.S. PATENT DOCUMENTS

| 8,345,429 B2 | 1/2013 | Kim et al. | |
| 8,704,944 B1* | 4/2014 | Wierzoch | H04N 23/66 348/207.99 |

(Continued)

FOREIGN PATENT DOCUMENTS

| EP | 2 759 848 A1 | 7/2014 |
| EP | 3 543 786 A1 | 9/2019 |
| JP | H09-204950 A | 8/1997 |

OTHER PUBLICATIONS

German Search Report dated Jan. 20, 2021 in related German Patent Application No. 10 2020 108 961.9 (four pages).

(Continued)

*Primary Examiner* — Lin Ye
*Assistant Examiner* — Chan T Nguyen
(74) *Attorney, Agent, or Firm* — Kilpatrick Townsend & Stockton LLP

(57) ABSTRACT

The present invention relates to a mobile device, preferably a cell phone, comprising a module holder for a camera module for capturing still images and/or moving images, said camera module having a coupling section and being releasably connectable to the module holder, wherein the module holder has a recess in which the coupling section is received when the camera module is connected to the mobile device. In the mobile device in accordance with the invention, provision is made that the recess of the module holder has a peripheral contour that is formed by a circular arc section and a secant section. The invention further relates to a corresponding camera module and to a mobile device system.

18 Claims, 6 Drawing Sheets

Figure 1:
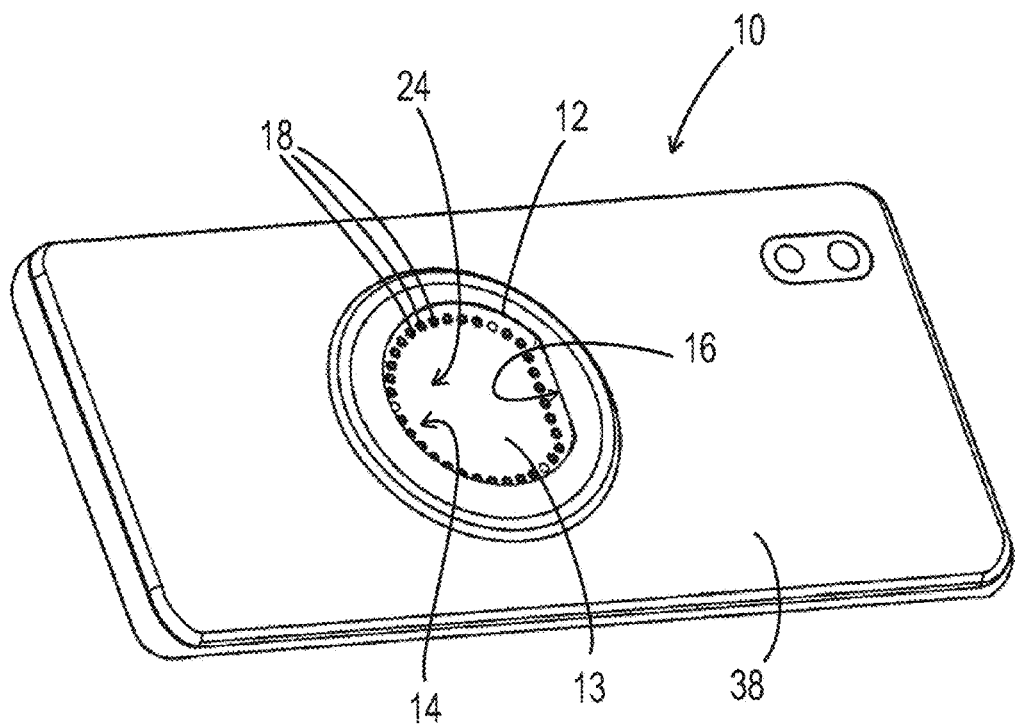

(58) Field of Classification Search
USPC .................................................. 348/373–375
See application file for complete search history.

(56) References Cited

U.S. PATENT DOCUMENTS

| | | |
|---|---|---|
| 2007/0166027 A1 | 7/2007 | Misawa |
| 2010/0208434 A1 | 8/2010 | Kim et al. |
| 2013/0163170 A1 | 6/2013 | Chen |
| 2014/0094221 A1 | 4/2014 | Yang |
| 2014/0111686 A1* | 4/2014 | Iikawa ................ G03B 17/14 |
| | | 348/374 |
| 2018/0013938 A1* | 1/2018 | Choi ...................... H05K 1/028 |
| 2020/0097045 A1* | 3/2020 | Claudepierre .... H04M 1/72409 |

OTHER PUBLICATIONS

International Search Report mailed May 7, 2021 in related International Application No. PCT/EP2021/056791 (five pages).

\* cited by examiner

MOBILE DEVICE, CAMERA MODULE, AND MOBILE DEVICE SYSTEM

This application is a U.S. National Phase Application of PCT/EP2021/056791, filed Mar. 17, 2021, which claims the priority of German Patent Application 10 2020 108 961.9, filed Mar. 31, 2020, the entireties of which are incorporated by reference herein.

The present invention relates to a mobile device, preferably a cell phone, comprising a module holder for a camera module for capturing still images and/or moving images, said camera module having a coupling section and being releasably connectable to the module holder, wherein the module holder has a recess in which the coupling section is received when the camera module is connected to the mobile device.

The invention further relates to a camera module for capturing still images and/or moving images for a mobile device having a module holder, preferably a cell phone, wherein the camera module has a coupling section that is configured to cooperate with the module holder of the mobile device in order to releasably connect the camera module to the mobile device, wherein the coupling section can be received in a recess of the module holder.

In general, said mobile device is an electronic end device for mobile, wireless data, voice and/or image communication. The mobile device can, for example, be designed as a cell phone, preferably as a smartphone, or as a portable small computer, preferably as a tablet computer.

Mobile devices of the category are usually equipped with one or more integrated cameras by means of which still images and/or moving images can be captured. The mobile device usually has means to process the images captured in the form of raw images, for example, to perform image corrections or to compress the image data. The processed images can be stored on an internal storage medium, i.e. a storage medium integrated into the mobile device, and/or on an external storage medium, for example a memory card insertable into the mobile device.

Furthermore, devices are usually present to transmit image data and other data wirelessly or also in a wired manner to other end devices and/or servers.

The performance capability of integrated cameras is often limited due to the only limited installation space available within the mobile device, which affects both the image sensor of an integrated camera and its optics. Thus, the resolution and/or the sensitivity of the image sensor can, for example, be reduced in comparison with devices having a sufficiently available installation space. In the case of the optics of an integrated camera, the installation space-related restrictions can, for example, have a disadvantageous effect on the light intensity and/or the optical resolution.

Dedicated still image cameras or video cameras, e.g. digital single-lens reflex cameras, are indeed capable of producing high-quality images. However, such dedicated cameras often have a high weight and also a considerable construction size, which has a disadvantageous effect on the handling and the transport. Furthermore, means for a wireless transmission of the images recorded are often not present in such cameras or are only present in a limited form.

Various solutions are known from the prior art in order nevertheless to generate images of a comparatively high quality with a mobile device of the category and, if necessary, to transmit them wirelessly to other devices by means of the mobile device.

For example, US 2010/0208434 A1 discloses a mobile end device to whose housing outer side a submodule such as a projector module or a camera module can be releasably fastened.

A frame for holding a camera module is described in U.S. Pat. No. 8,704,944 B1. A smartphone can be clipped in this frame designated as a "cradle," wherein the transmission of commands and image data between the frame and the smartphone takes place wirelessly.

A smartphone is known from US 2014/0094221 A1 that has a bayonet fastening for coupling an external module, for example, a camera module.

For a reliable coupling of an external camera module to a mobile device, a mechanically stable and easy-to-handle interface between the mobile device and the camera module is desirable.

It is the object of the invention to provide a mobile device and a camera module that have an improved interface for connecting the mobile device and the camera module.

The object is satisfied by a mobile device having the features of claim 1 and by a camera module having the features of claim 11.

In the mobile device in accordance with the invention, provision is made that the recess of the module holder has a peripheral contour that is formed by a circular arc section and a secant section. The circular arc section and the secant section adjoin one another such that the secant section connects the two end points of the circular arc section. Between the circular arc section and the secant section, there are no or only very short transition sections that can, for example, be formed in the shape of a respective rounding that is caused by a technical production aspect and that has a very small radius in the order of magnitude of 1 mm. The radius of the circular arc section is preferably constant over the length of the circular arc. In general, however, the radius of the circular arc section can also vary within certain limits, in which case the term "circular arc section" is not to be interpreted in the strict geometric literal sense, but in this case at least approximately describes the course of the peripheral contour.

Due to the design in accordance with the invention of the peripheral contour of the module holder and accordingly also of the peripheral contour of the coupling section, explained in more detail below, of a camera module, a compact design of the mechanical interface between the mobile device and the camera module is implemented in comparison with other designs, wherein a coupling secure against rotation is nevertheless ensured.

In accordance with an advantageous embodiment of the mobile device, the angle over which the circular arc section extends amounts to at least 270°, preferably at least 300°, particularly preferably at least 315°.

The circular arc section advantageously has a latch section and the secant section advantageously has an undercut section, with the latch section cooperating with a latch section of the camera module and the undercut section cooperating with an undercut section of the camera module when the camera module is connected to the mobile device. A stable connection between the module holder and the camera module is thereby provided that is nevertheless easy to establish and to sever again. To establish the connection, the camera module is first hung or hooked obliquely with its undercut section into the undercut section of the module holder. The latch sections are subsequently brought into engagement with one another by a tilting movement. The release takes place in reverse order, i.e. the latch sections are first brought out of engagement on a slight tilting and then the undercut section of the camera module is dismantled or unhooked from the undercut section of the module holder.

In accordance with a further advantageous embodiment of the mobile device, the latch section and the undercut section of the module holder are provided at a peripheral wall, preferably at an inner peripheral wall bounding the recess, of the module holder. In such an embodiment, the base of the recess of the module holder can be free of fastening elements or coupling elements.

The undercut section of the module holder advantageously extends over the total length of the associated secant section. Alternatively or additionally, the latch section of the module holder extends over a part section, preferably over a part section disposed opposite the secant section, of the associated circular arc section. For example, the latch section can extend over 25% to 75% of the arc length or of the angular range of the circular arc section.

In accordance with a further advantageous embodiment of the mobile device, the latch section of the module holder is configured as at least one rigid latch nose that is preferably configured to cooperate with a respective associated latch section provided at the coupling section of the camera module, preferably with a resilient or spring supported latch element. Alternatively thereto, the latch section of the module holder can be configured as at least one resilient or spring supported latch element that is preferably configured to cooperate with a respective associated latch section provided at the coupling section of the camera module, preferably with a rigid latch nose. In both alternatives, a respective latch element cooperates with an associated latch nose.

The latch nose can also be configured as a laterally extended continuous bead that cooperates with a plurality of latch elements.

The latch nose is advantageously provided at the module holder and the latch element is accordingly provided at the coupling section so that it is avoided that movable and therefore particularly sensitive parts are located at the module holder. The risk of damage to the module holder is thereby reduced when the mobile device is used without a connected camera module that would otherwise cover or bound the movable parts.

In accordance with a further advantageous embodiment of the mobile device, the module holder has a plurality of electrical contact elements that are configured to cooperate with associated electrical contact elements provided at the coupling section of a connected camera module in order to provide an electrical interface for transmitting electrical signals and operating currents between the mobile device and the camera module, with preferably the contact elements of the module holder being provided at a base surface of the recess. The electrical interface that is hereby provided in particular serves to transmit a supply voltage and control signals from the mobile device to the camera module and to transmit image signals from the camera module to the mobile device so that the image signals can be further processed and/or stored in the mobile device and/or can be transmitted from the mobile device to other remote devices, if necessary. Further data, in particular metadata such as setting values of the camera module, can also be transmitted via the electrical interface.

The arrangement of the contact elements of the module holder at the base surface of the recess, in particular in cooperation with the arrangement of the latch sections and undercut sections at the peripheral wall of the module holder, provides a good spatial separation between the mechanical part and the electrical part of the interface between the module holder and the camera module.

The contact elements of the module holder are advantageously configured as rigid contact elements, preferably as planar contact surfaces. This embodiment likewise contributes towards no movable parts having to be provided at the module holder itself, whereby the risk of damage is likewise reduced when the module device is used without a connected camera module.

In accordance with a further advantageous embodiment of the mobile device, the contact elements of the module holder are arranged within the peripheral contour along a curve that preferably extends at a constant spacing from the peripheral contour. Corresponding to the peripheral contour, the curve likewise has a section of a circular arc shape and a linearly extending secant-shaped section.

The mobile device advantageously has an assembly frame that is configured as a holder for a plurality of components of the mobile device, wherein the mobile device comprises a camera module carrier that is fastened directly to the assembly frame and that has the module holder. The module holder can be releasably fastened, preferably replaceably fastened, to the rest of the camera module carrier. The camera module carrier serves to reliably transfer the forces exerted onto the module holder by a coupled camera module to the very stable assembly frame that is usually configured as a metal part. A secure connection between the camera module and the mobile device is thereby ensured and the risk of damage to the module device, in particular a tearing off or tearing out of the module holder, is substantially reduced.

In the camera module in accordance with the invention, provision is made that the coupling section has a peripheral contour that is formed by a circular arc section and a secant section. The peripheral contour of the coupling section is preferably formed complementary to the peripheral contour of the module holder so that a problem-free coupling between the camera module and the mobile device becomes possible.

Advantageous embodiments of the camera module will be described in the following, wherein advantages described above of respective corresponding advantageous embodiments of the mobile device also apply in an analogous manner to the advantageous embodiments of the camera module, even if these advantages are not expressly mentioned in the following. Further advantageous embodiments and advantages additionally also result from combinations of advantageous embodiments of the camera module and advantageous embodiments of the mobile device.

In accordance with an advantageous embodiment of the camera module, the angle over which the circular arc section extends amounts to at least 270°, preferably at least 300°, particularly preferably at least 315°.

In accordance with a further advantageous embodiment of the camera module, the circular arc section has a latch section and the secant section has an undercut section, with the latch section being configured to cooperate with a latch section of the camera module, and with the undercut section being configured to cooperate with an undercut section of the module holder when the camera module is connected to the mobile device.

The latch section and the undercut section of the coupling section are advantageously provided at a peripheral wall, preferably at an outer peripheral wall, of the coupling section. Thus, the end face of the coupling section is free of fastening elements or coupling elements.

In accordance with a further advantageous embodiment of the camera module, the undercut section of the coupling section extends over the total length of the associated secant section. Alternatively or additionally, the latch section of the coupling section extends over a part section, preferably over a part section disposed opposite the secant section, of the associated circular arc section. In a corresponding manner, the latch section of the coupling section advantageously extends over 25 to 75% of the arc length or of the angular range of the circular arc section.

The latch section of the coupling section is advantageously configured as at least one resilient or spring supported latch element that is preferably configured to cooperate with a respective associated latch section provided at the module holder, preferably with a rigid latch nose. Alternatively, the latch section of the coupling section can be configured as at least one rigid latch nose that is preferably configured to cooperate with a respective associated latch section provided at the module holder, preferably with a resilient or spring supported latch element. One or more latch elements can accordingly be provided.

If, in accordance with the first alternative, the latch element is provided at the coupling section and the latch nose is accordingly provided at the module holder, this contributes towards, in an advantageous manner, no movable parts having to be located at the module holder so that the risk of damage during a use of the mobile device without a connected camera module is reduced.

In accordance with a further advantageous embodiment, the coupling section has a plurality of electrical contact elements that are configured to cooperate with associated electrical contact elements provided at the module holder of a connected mobile device in order to provide an electrical interface for transmitting electrical signals and operating currents between the mobile device and the camera module, with preferably the contact elements of the coupling section being provided at the end face of the coupling section. Said end face of the coupling section is a surface that is disposed opposite a light entry opening of the camera module and that preferably extends in parallel with the base surface of the recess of the module holder when the camera module is connected to the mobile device.

The contact elements of the coupling section are advantageously configured as resilient or spring supported contact elements, preferably as contact pins or contact springs. The contact elements of the coupling section are preferably displaceably supported in the axial direction, i.e. in the direction of an optical axis of the camera module. A reliable contact with the contact elements of the module holder is hereby ensured. The arrangement of resilient or spring supported contact elements at the coupling section of the camera module allows the corresponding contact elements of the module holder to be formed as rigid, which in turn contributes towards keeping the module holder free of movable parts to reduce the risk of damage when the camera module is not coupled.

In accordance with a further advantageous embodiment of the camera module, the contact elements of the coupling section are arranged within the peripheral contour along a curve that preferably extends at a constant spacing from the peripheral contour.

The invention further relates to a mobile device system that comprises a mobile device in accordance with one of the embodiments in accordance with the invention or one of the advantageous embodiments, and at least one camera module in accordance with one of the embodiments in accordance with the invention or one of the advantageous embodiments that is releasably connected or connectable to the mobile device.

Further advantageous embodiments of the mobile device, of the camera module, and of the mobile device system result from the dependent claims, from the description, and from the drawings.

The invention will be described in the following with reference to an embodiment and to the drawings.

Figure 2:
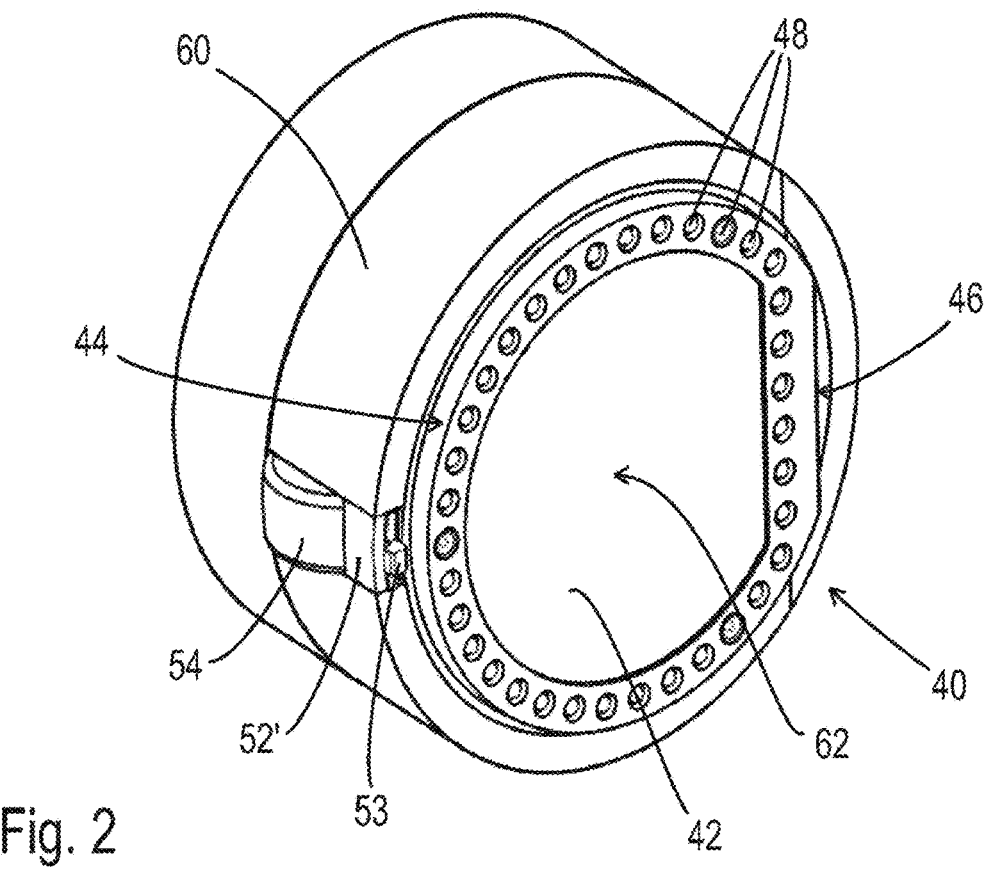
Figure 3:
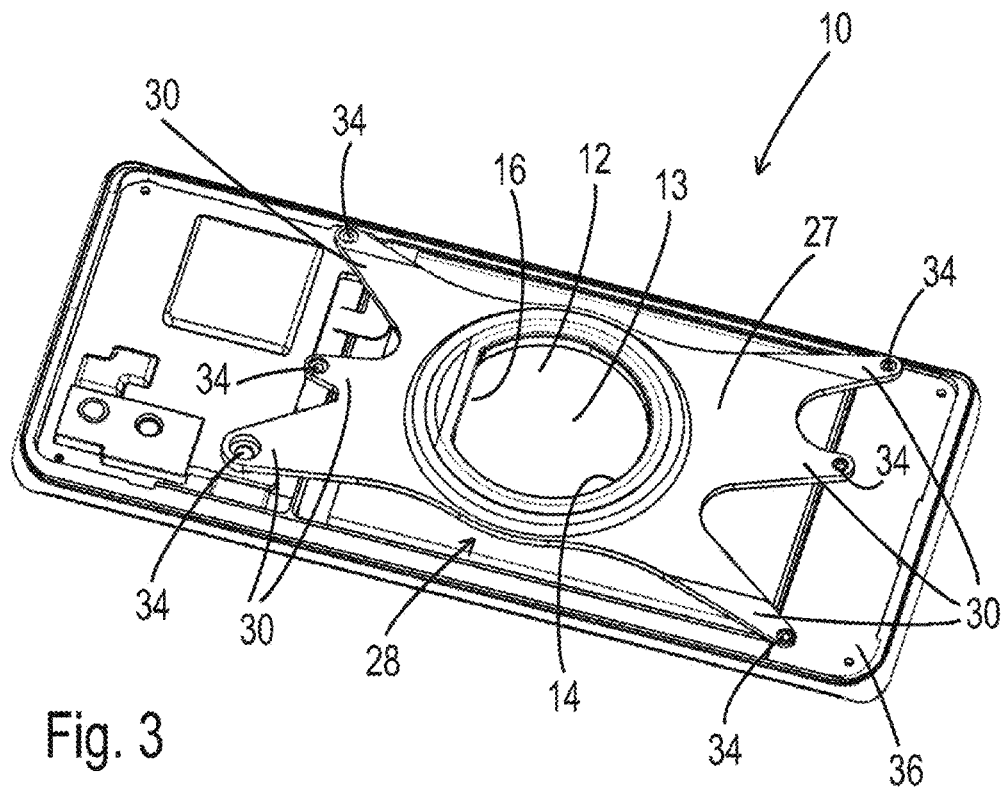
Figure 4:
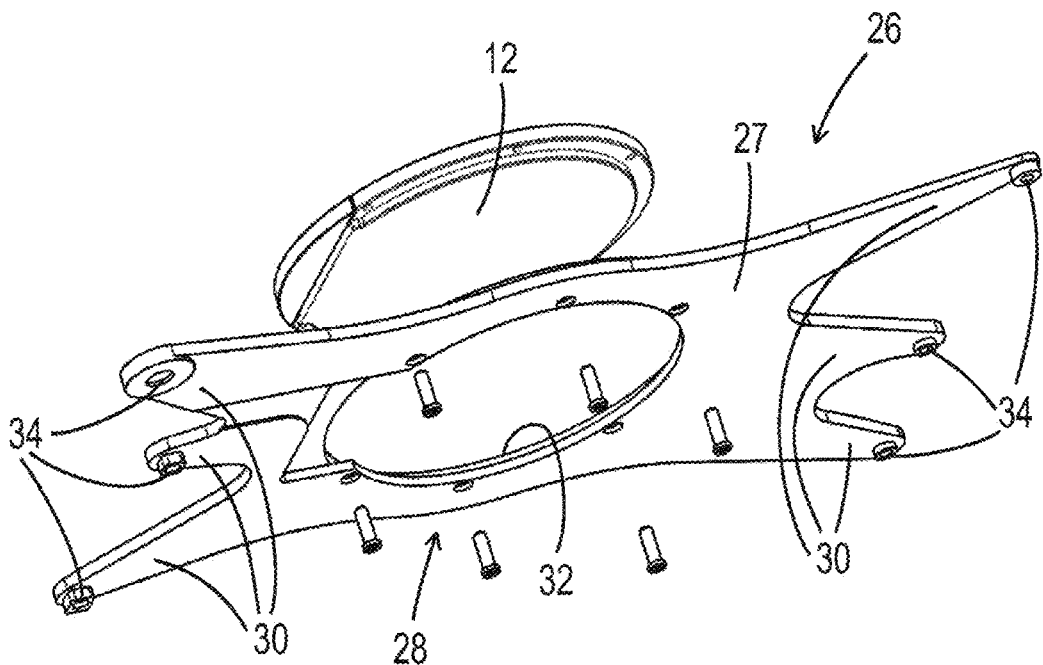
Figure 5:
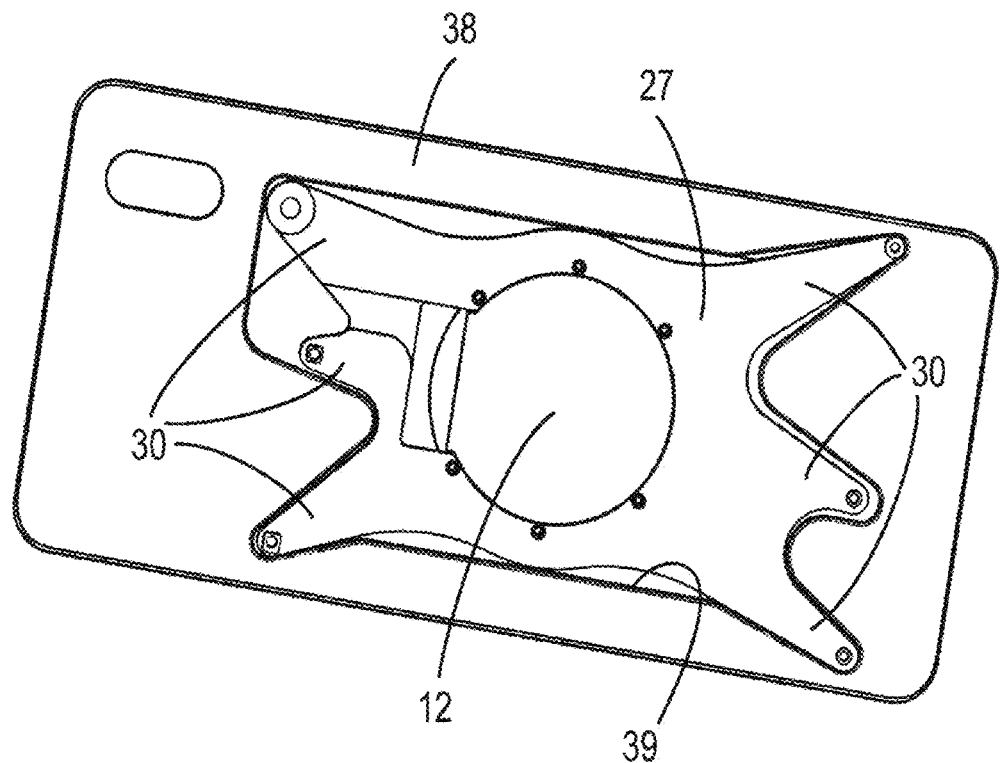
Figure 6:
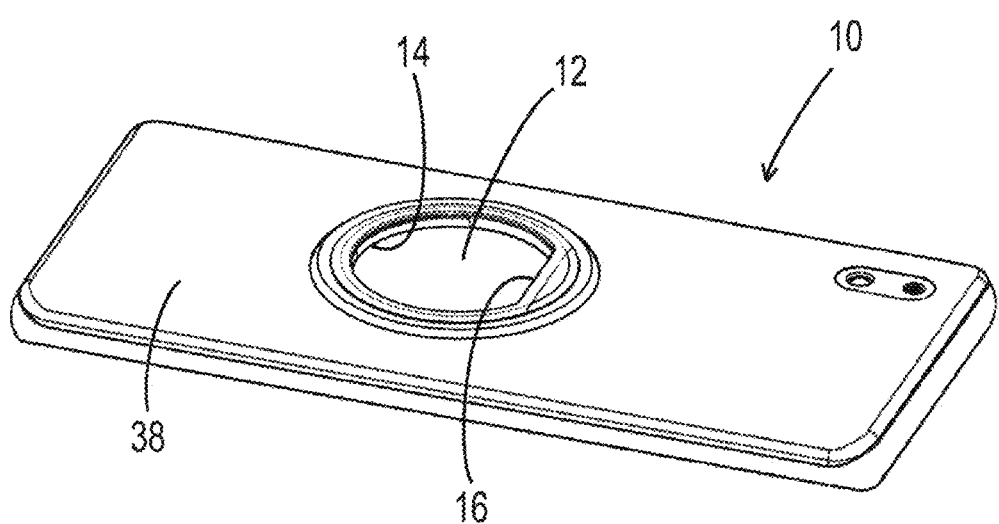
Figure 7:
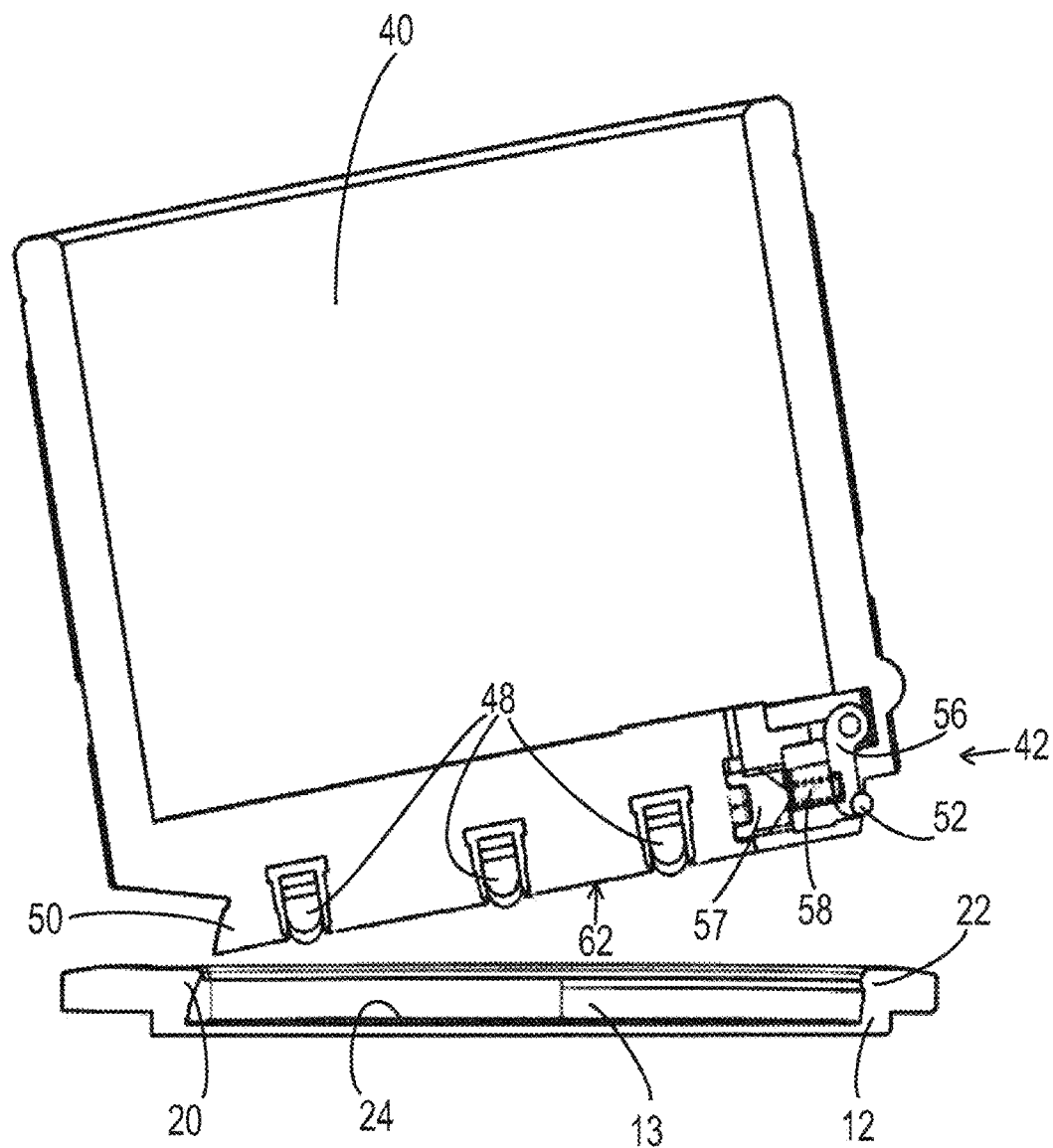
Figure 8:
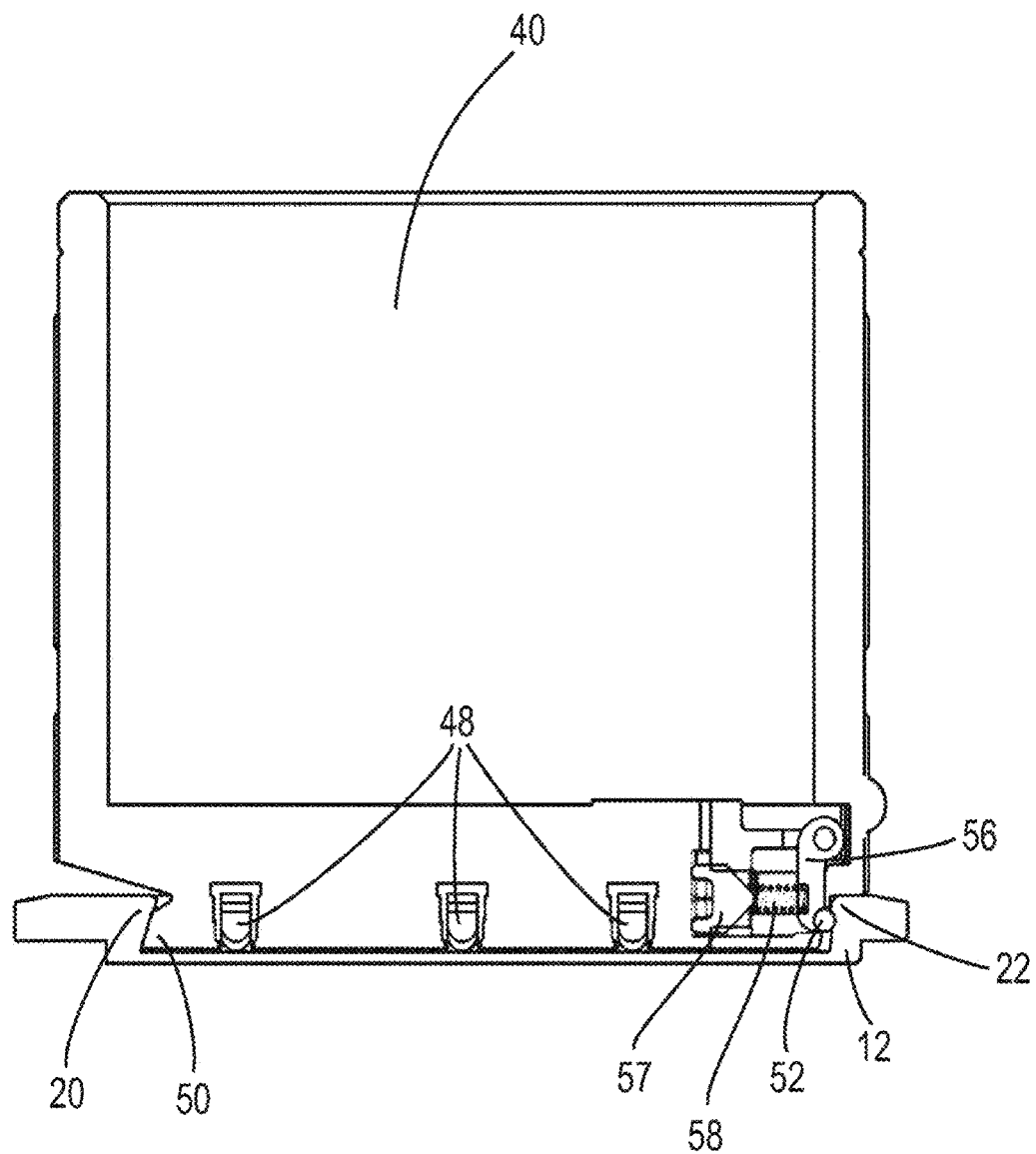
Figure 9:
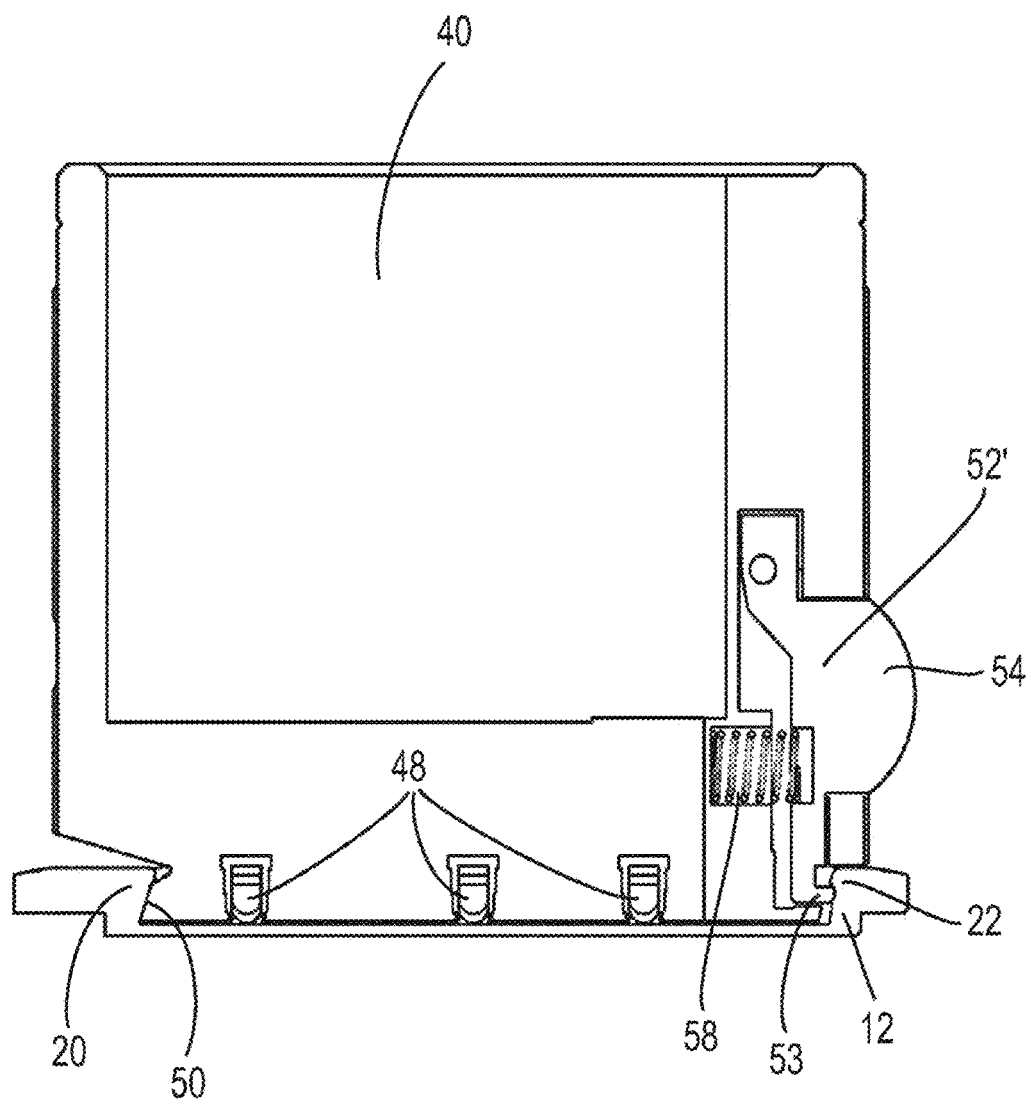

FIG. 1 a perspective view of a mobile device in accordance with an embodiment;

FIG. 2 a perspective view of a camera module accordance with an embodiment;

FIG. 3 a perspective inner view of the mobile device of FIG. 1;

FIG. 4 an exploded view of a camera module carrier;

FIG. 5 a perspective inner view of a rear shell for a mobile device, said rear shell being connected to the camera module carrier of FIG. 4;

FIG. 6 a further perspective view of the mobile device of FIG. 1;

FIGS. 7 and 8 cross-sections through a camera module and a module holder in different assembly positions; and FIG. 9 a cross-section through a camera module and a module holder in a connected position in accordance with a modification.

The same or similar elements are provided with the same reference numerals in the following.

In FIG. 1, a mobile device 10 is shown that is designed as a cell phone or a smartphone in the present embodiment. In general, the present invention can also be used with other types of mobile devices such as small portable computers that are also designated as tablet computers.

FIG. 1 shows the mobile device 10 from its rear side, i.e. the side disposed opposite a screen of the mobile device 10. The mobile device 10 has a housing that comprises a rear shell 38. Approximately at the center of the rear shell 38, a circular recess is located in which a module holder 12 is arranged. The outer contour of the module holder 12 is likewise circular.

The module holder 12 has a recess 13 that faces towards the outer side of the mobile device 10 and that is bounded by a peripheral contour, wherein the peripheral contour has a circular arc section 14 and a secant section 16 extending in a straight line. The circular arc section 14 and the secant section 16 so-to-say define peripheral walls that laterally bound the recess 13. Further details of the module holder 12 can also be seen from FIGS. 3, 6, 7, and 8.

The recess 13 has a base surface 24 in which a plurality of electrical contact elements 18 are embedded. The electrical contact elements 18 can, for example, be formed as planar contact surfaces. The contact elements 18 are arranged distributed within the peripheral contour along a curve extending at a constant spacing from the peripheral contour.

In FIG. 2, a camera module 40 is shown that is releasably connectable to the mobile device 10 by means of the module holder 12. The camera module 40 can comprise an image sensor, which is configured to capture still images or moving images, and an objective having one or more lenses for generating images on the image sensor. The image sensor and the objective are not shown in the drawings for reasons of simplicity.

The camera module 40 has an approximately cylindrical body 60 whose one end face disposed opposite a light entry opening is adjoined by a coupling section 42 projecting somewhat in the axial direction. The coupling section 42 has a peripheral contour that is set back slightly inwardly with respect to a peripheral contour of the body 60 and that is composed of a circular arc section 44 and a secant section 46.

The circular arc section 44 and the secant section 46 of the camera module 40 are matched to the circular arc section 14 and the secant section 16 of the module holder 12 (FIGS. 1, 6, 7, and 8) such that the coupling section 42 can be received in the recess 13 and can be latched to the module holder 12 in order to connect the camera module 40 to the mobile device 10. The design of the coupling section 42 corresponds to the modification described with respect to FIG. 9.

Contact elements 48 that correspond to the contact elements 18 of the module holder with respect to their number and positioning are arranged at an end face 62 of the coupling section 42 so that a respective contact element 48 of the camera module 40 can enter into electrical contact with an associated contact element 18 of the module holder 12. The contact elements 48 can, for example, be configured as spring-loaded contact pins to apply the contact pressure necessary for a reliable electrical contact when the camera module 40 is connected to the mobile device 10.

The contact elements 18, 48 define an electrical interface between the camera module 40 and the mobile device 10, via which electrical interface control signals can be transmitted from the mobile device 10 to the camera module 40 and image signals generated by the image sensor can be transmitted from the camera module 40 to the mobile device 10. Furthermore, a supply voltage provided by an accumulator of the mobile device 10 can also be transmitted to the camera module 40 if the camera module 40 does not have its own power supply.

With respect to FIGS. 7 and 8, the design of the mechanical interface between the camera module 40 and the mobile device 10 will now be explained in more detail. For reasons of clarity, the camera module 40 is shown somewhat simplified and without electrical and optical components with the exception of some contact elements 48 shown by way of example. Of the mobile device 10, only the module holder 12 is shown, wherein, as is also the case with the camera module 40, the electrical contact elements are not shown for better clarity.

The secant sections 16, 46 of the module holder 12 or of the camera module 40 have respective undercut sections 20, 50, which cooperate with one another, over a large part of their length. In a part region of the circular arc section 14 of the module holder 12, a latch section configured as a bead-shaped latch nose 22 is provided that extends spaced apart from the base surface 24 along a peripheral wall of the recess 13. To enable a problem-free insertion of the coupling section 42 into the recess 13, the bead-shaped latch nose 22 extends opposite from the undercut section 20 over an angular range that amounts to slightly less than 180°.

At an outwardly facing peripheral wall of the coupling section 42, a movably supported, spherical-shaped latch element 52 is provided as a complementary latch section and is preloaded radially outwardly via a compression spring 58 and a pivot arm 56. On the one hand, the preload has the effect that the latch element 52 reliably engages behind the latch nose 22 and a slipping of camera module 40 out of the module holder 12 is thus avoided. Furthermore, the force of the compression spring 58 generates a clamping force that holds the undercut sections 20, 50 in engagement. To be able to set the preload or clamping force generated by the compression spring 58 and thus the holding force of the mechanical interface, the preload of the compression spring 58 can be changed by turning an adjustment screw 57 that cooperates with the compression spring 58 and that is, for example, configured as a grub screw.

To connect or to latch the camera module 40 to the mobile device 10 or to the module holder 12, the camera module 40 is first inserted slightly tilted with the coupling section 42 into the recess 13, wherein a contact between the undercut sections 20, 50 is first established (cf. FIG. 7). The camera module 40 is then tilted so that the latch element 52 slides over the latch nose 22, wherein, on the passing of the latch nose 22, the latch element 52 springs back slightly into the interior of the coupling section 42 against the force exerted by the compression spring 58 and then engages behind the latch nose 22 (cf. FIG. 8). To release or unlatch the camera module 40, the opposite procedure is followed, wherein a sufficient tilt torque has to be applied for this purpose in order to overcome the force exerted by the compression spring 58 and to effect a springing back of the latch element 52.

A modification of the mechanical interface described with respect to FIGS. 7 and 8 between the camera module 40 and the mobile device 10 is shown in FIG. 9. While the module holder 12 corresponds to the embodiment described with respect to FIGS. 7 and 8, with the exception of a slightly different contouring of the latch nose 22, the coupling section 42 varies with respect to the features described in the following.

Instead of the spherical-shaped latch element 52, a pivotably supported, lever-like latch element 52' is provided that is radially outwardly preloaded via a compression spring 58. In accordance with the embodiment of FIGS. 7 and 8, the preload has the effect that a latch section 53 formed at the latch element 52' reliably engages behind the latch nose 22 and a slipping of the camera module 40 out of the module holder 12 is thus avoided. Furthermore, the force of the compression spring 58' generates a clamping force that holds the undercut sections 20, 50 in engagement.

While the connection or latching of the camera module 40 to the module holder 12 can take place in the same manner as in the embodiment in accordance with FIGS. 7 and 8, in the modification in accordance with FIG. 9, an actuation section 54 provided at the latch element 52' has to be pressed in addition to a tilting of the camera module 40 in order to release the camera module since, due to different contourings, the latch section 53 and the latch nose 22 engage behind one another in comparison with the embodiment in accordance with FIGS. 7 and 8 such that an unlatching is not possible without a pressing of the actuation element 54. Due to the pressing of the actuation element 54, the latch element 52' is pivoted back slightly into the interior of the coupling section 42 against the force of the compression spring 58 and the latch section 53 is brought out of engagement with the latch nose 22.

Since the contourings of the latch section 53 and the latch nose 22 are selected such that a release of the camera module 40 from the module holder 12 solely by a tilting or a tipping is not possible, the risk of an unintentional decoupling of the camera module 40 is reduced in the embodiment of the interface in accordance with FIG. 9 in comparison with the embodiment in accordance with FIGS. 7 and 8.

With respect to FIGS. 3 to 6, the manner in which the module holder 12 is connected to the rest of the mobile device 10 will be explained in more detail in the following. The mobile device 10 has an assembly frame 36 that is preferably manufactured from metal and that substantially extends in the interior of the mobile device 10. In dependence on the design, part sections of the assembly frame 36 can be visible from the outside and can thus define the narrow side of the mobile device 10. Operating elements such as buttons or electrical connections can in particular be provided in this region. The assembly frame 36 serves as a carrier for different components of the mobile device 10, for example, electrical components, circuit boards, further cameras, an accumulator for the power supply, radio modules, and the like.

In the present embodiment, the module holder 12 is part of a camera module carrier 26 that is connected to the assembly frame 36. As can in particular be easily seen in FIGS. 3 and 4, the camera module carrier 26 has a central region 28 in which the module holder 12 is provided. In the present embodiment, the camera module carrier 26 is formed in multiple parts and, in addition to the module holder 12, comprises a carrier plate 27 in which a circular receiver 32 for the module holder 12 is formed. In this respect, the module holder 12 is screwed to the carrier plate 27 so that an exchange of the module holder 12, for example in the event of damage or a replacement required for other reasons, can be performed. In accordance with a modification not shown, the module holder 12 can, however, also be integrally formed in the camera module carrier 26.

The camera module carrier 26 or the carrier plate 27 has six finger-like struts 30 that extend away, starting from the central region 28, and that taper toward their distal ends. At the distal end points of the struts 30, respective fastening points 34 are provided that have bores for receiving fastening screws and at least partly flange-like thickened portions to establish a desired spacing between the assembly frame 36 and the camera module carrier such that a sufficient installation space is still available for receiving further components of the mobile device 10 between the assembly frame 36 and the camera module carrier 26.

The spider-like design of the camera module carrier 16 or of the carrier plate 27 with free spaces extending between the struts 30 ensures, on the one hand, that sufficient installation space is available for further components of the mobile device 10 and is not unnecessarily occupied by the camera module carrier 26. Furthermore, the weight of the camera module carrier 26 can be reduced to a necessary amount by this design. If the camera module carrier 26 is produced from metal, an impairment of the reception paths for radio signals by shielding and/or reflection effects can be reduced by the slim spider-shaped design.

With respect to FIGS. 5 and 6, it will now be explained in more detail how the rear shell 38 and the camera module carrier 26 can be connected to the assembly frame 36.

The rear shell 38, which can, for example, be manufactured from a stable plastic material, has a deepened portion 39, in which the material thickness of the rear shell 38 is somewhat reduced, in an overlap region with the module carrier 26. The contour of the deepened portion 39 largely follows the outer contour of the camera module carrier 26.

The camera module carrier 26 can first be fastened to the assembly frame 36, in particular screwed to the assembly frame 36. For this purpose, fastening screws can be guided through the bores in the fastening points 34 of the camera module carrier 26 and screwed in corresponding threaded bores provided at the assembly frame 36. The rear shell 38 covering the camera module carrier 26 is then likewise fastened to the assembly frame 36, which can, for example, take place by a screwing, in particular from the inside, a latching, or an adhesive bonding. To further increase the stability, the rear shell 38 can additionally be adhesively bonded to the camera module carrier 26.

In accordance with a modification, the rear shell 38 can also be connected to the assembly frame 36 together with the camera module carrier 26. The rear shell 38 can have bores that are aligned with the bores in the fastening points 34 of the camera module carrier 26. The fastening of the rear shell 38 and of the camera module carrier 26 takes place such that fastening screws are guided through the bores from an outer side of the rear shell 38 and are screwed in corresponding threaded bores provided at the assembly frame 36. The module carrier is thus fixed to the assembly frame 36 together with the rear shell 38 with the aid of these fastening screws. In addition, an adhesive bonding can be provided between the rear shell 38 and the camera module carrier 26. If the rear shell 38 and the camera module carrier 26 are adhesively bonded to one another, the bores in the rear shell 38 can in this respect also be made so large that the heads of the fastening screws do not enter into a form-fitting connection with the rear shell 38, but the bores in the rear shell 38 are so-to-say formed as depressions to receive the screw heads flush with or recessed with respect to the outer surface of the rear shell 38. To cover the bores for the fastening screws, the outer side of the rear shell 38 can be covered with a cover or a film that covers the bores to prevent the penetration of dirt or moisture into the interior of the mobile device 10.

REFERENCE NUMERAL LIST 10 mobile device
12 module holder
13 recess
14 circular arc section
16 secant section
18 contact element
20 undercut section
22 latch nose
24 base surface
26 camera module carrier
27 carrier plate
28 central region
30 strut
32 receiver
34 fastening point
36 assembly frame
38 rear shell
39 deepened portion
40 camera module
42 coupling section
44 circular arc section
46 secant section
48 contact element
50 undercut section
52, 52' latch element
53 latch section
54 actuation section
56 pivot arm
57 adjustment screw
58 compression spring
60 body
62 end face

The invention claimed is:

1. A mobile device comprising a module holder for a camera module for capturing still images and/or moving images, said camera module having a coupling section and being releasably connectable to the module holder,
  wherein the module holder has a recess in which the coupling section is received when the camera module is connected to the mobile device, and wherein the recess of the module holder has a peripheral contour that is formed by a circular arc section and a secant section, wherein the circular arc section has a latch section and the secant section has an undercut section, with the latch section cooperating with a latch section of the camera module and the undercut section cooperating with an undercut section of the camera module when the camera module is connected to the mobile device.

2. The mobile device in accordance with claim 1, wherein the angle over which the circular arc section extends amounts to at least 270°.

3. The mobile device in accordance with claim 1, wherein the latch section and the undercut section of the module holder are provided at a peripheral wall of the module holder.

4. The mobile device in accordance with claim 1, wherein the undercut section of the module holder extends over the total length of the associated secant section, and/or
wherein the latch section of the module holder extends over a part section of the associated circular arc section.

5. The mobile device in accordance with claim 1 wherein the latch section of the module holder is configured as at least one rigid latch nose, or
wherein the latch section of the module holder is configured as at least one resilient or spring supported latch element.

6. The mobile device in accordance with claim 1 wherein the module holder has a plurality of electrical contact elements that are configured to cooperate with associated electrical contact elements provided at the coupling section of a connected camera module in order to provide an electrical interface for transmitting electrical signals and operating currents between the mobile device and the camera module.

7. The mobile device (10) in accordance with claim 6, wherein the contact elements of the module holder are configured as rigid contact elements.

8. The mobile device in accordance with claim 6, wherein the contact elements of the module holder are arranged within the peripheral contour along a curve.

9. The mobile device in accordance with claim 1 wherein the mobile device has an assembly frame that is configured as a holder for a plurality of components of the mobile device, and
wherein the mobile device comprises a camera module carrier that is fastened directly to the assembly frame and that has the module holder.

10. A camera module for capturing still images and/or moving images for a mobile device, the mobile device having a module holder, wherein the camera module has a coupling section that is configured to cooperate with the module holder of the mobile device in order to releasably connect the camera module to the mobile device, wherein the coupling section can be received in a recess of the module holder,
and wherein the coupling section has a peripheral contour that is formed by a circular arc section and a secant section, wherein the circular arc section has a latch section and the secant section has an undercut section, with the latch section being configured to cooperate with a latch section of the module holder, and with the undercut section being configured to cooperate with an undercut section of the module holder when the camera module is connected to the mobile device.

11. The camera module in accordance with claim 10, wherein the angle over which the circular arc section extends amounts to at least 270°.

12. The camera module in accordance with claim 11, wherein the latch section and the undercut section of the coupling section are provided at a peripheral wall of the coupling section.

13. The camera module in accordance with claim 10, wherein the undercut section of the coupling section extends over the total length of the associated secant section, and/or
wherein the latch section of the coupling section extends over a part section of the associated circular arc section.

14. The camera module (40) in accordance with claim 10 wherein the latch section of the coupling section is configured as at least one resilient or spring supported latch element, or
wherein the latch section of the coupling section is configured as at least one rigid latch nose.

15. The camera module in accordance with claim 10, wherein the coupling section has a plurality of electrical contact elements that are configured to cooperate with associated electrical contact elements provided at the module holder of a connected mobile device in order to provide an electrical interface for transmitting electrical signals and operating currents between the mobile device and the camera module.

16. The camera module in accordance with claim 15, wherein the contact elements of the coupling section are configured as resilient or spring supported contact elements.

17. The camera module in accordance with claim 15, wherein the contact elements of the coupling section are arranged within the peripheral contour along a curve.

18. A mobile device system comprising:
a mobile device in accordance with claim 1; and
at least one camera module in accordance with claim 10 that is releasably connected or connectable to the mobile device.

* * * * *